United States Patent
Renauld et al.

(10) Patent No.: US 10,871,911 B2
(45) Date of Patent: Dec. 22, 2020

(54) REDUCING DATA AMPLIFICATION WHEN REPLICATING OBJECTS ACROSS DIFFERENT SITES

(71) Applicant: VMware, Inc., Palo Alto, CA (US)

(72) Inventors: Pascal Renauld, Palo Alto, CA (US);
Enning Xiang, San Jose, CA (US);
Eric Knauft, San Francisco, CA (US)

(73) Assignee: VMware, Inc., Palo Alto, CA (US)

(*) Notice: Subject to any disclaimer, the term of this patent is extended or adjusted under 35 U.S.C. 154(b) by 178 days.

(21) Appl. No.: 15/660,682

(22) Filed: Jul. 26, 2017

(65) Prior Publication Data
US 2019/0034087 A1 Jan. 31, 2019

(51) Int. Cl.
G06F 3/06 (2006.01)
G06F 11/14 (2006.01)
G06F 11/10 (2006.01)
G06F 9/455 (2018.01)
G06F 16/27 (2019.01)

(52) U.S. Cl.
CPC ............ G06F 3/065 (2013.01); G06F 3/0619 (2013.01); G06F 3/0664 (2013.01); G06F 3/0688 (2013.01); G06F 3/0689 (2013.01); G06F 9/45558 (2013.01); G06F 11/1076 (2013.01); G06F 11/1464 (2013.01); G06F 16/27 (2019.01); G06F 2009/45579 (2013.01); G06F 2009/45583 (2013.01); G06F 2009/45595 (2013.01); G06F 2201/84 (2013.01)

(58) Field of Classification Search
CPC .. G06F 9/45558; G06F 11/1464; G06F 16/27; G06F 3/0619; G06F 3/065; G06F 3/0689; G06F 11/1076

USPC .......................................................... 711/162
See application file for complete search history.

(56) References Cited

U.S. PATENT DOCUMENTS

| 9,753,813 | B1* | 9/2017 | Fan .................. G06F 3/065 |
| 9,805,108 | B2* | 10/2017 | Merriman .......... G06F 16/273 |
| 2016/0062685 | A1* | 3/2016 | Sundararajan ........ G06F 3/067 711/162 |
| 2016/0063029 | A1* | 3/2016 | Mu ................... H04L 67/1097 707/620 |
| 2017/0115891 | A1* | 4/2017 | O'Krafka ............. G06F 3/0604 |
| 2017/0300383 | A1* | 10/2017 | Kato .................... G06F 3/0619 |
| 2018/0276142 | A1* | 9/2018 | Algieri ................ G06F 3/0656 |

\* cited by examiner

*Primary Examiner* — Daniel C. Chappell
*Assistant Examiner* — Edward Waddy, Jr.
(74) *Attorney, Agent, or Firm* — Patterson + Sheridan LLP

(57) ABSTRACT

Component objects of a virtual disk are backed by first storage nodes, which are at a primary site, and replicated in second storage nodes, which are at a secondary site. Responsive to a write command issued to the virtual disk, a coordinating node at the primary site issues a first write operation to a first replication module running therein, and transmits a second write operation to a second replication module running in a coordinating node at the secondary site. The first replication module, responsive to the first write operation, instructs the first storage nodes backing first and second component objects of the virtual disk to write the data. The second replication module, responsive to the second write operation, instructs the second storage nodes backing third and fourth component objects, which are replicas of the first and second component objects, respectively, to write the data.

20 Claims, 10 Drawing Sheets

REDUCING DATA AMPLIFICATION WHEN REPLICATING OBJECTS ACROSS DIFFERENT SITES

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation. Because the shared local disks that make up the datastore may have different performance characteristics (e.g., capacity, input/output per second (IOPS) capabilities, etc.), usage of such shared local disks to store virtual disks or portions thereof may be distributed among the virtual machines based on the needs of each given virtual machine. Accordingly, in some cases, a virtual disk of a virtual machine may be partitioned into different data chunks that are distributed among and stored by local disks of hosts in the datastore. In addition, as a way to enhance reliability in the distributed storage system, in some cases, different levels of fault tolerance techniques may be used. For example, a virtual disk may be replicated into multiple copies and stored as chunks by local disks of a number of host computers in the cluster.

In some cases, host computers in the cluster that store chunks of a virtual disk may be spread across multiple geographically distinct sites or data centers. For example, one or more host computers storing several chunks of a virtual disk may be located at a data center in one city while another one or more host computers storing other chunks of the virtual disk may be located at another data center in another city. In such cases, I/O operations between a host computer, in charge of coordinating all copies of the virtual disk, at one of the data centers and the other host computers storing copies of the virtual disk at the other data center would be performed over the network (e.g., wide area network (WAN)). However, performing I/O operations over a WAN between two geographically distinct sites, in some case, results in data amplification.

DETAILED DESCRIPTION

Figure 1:
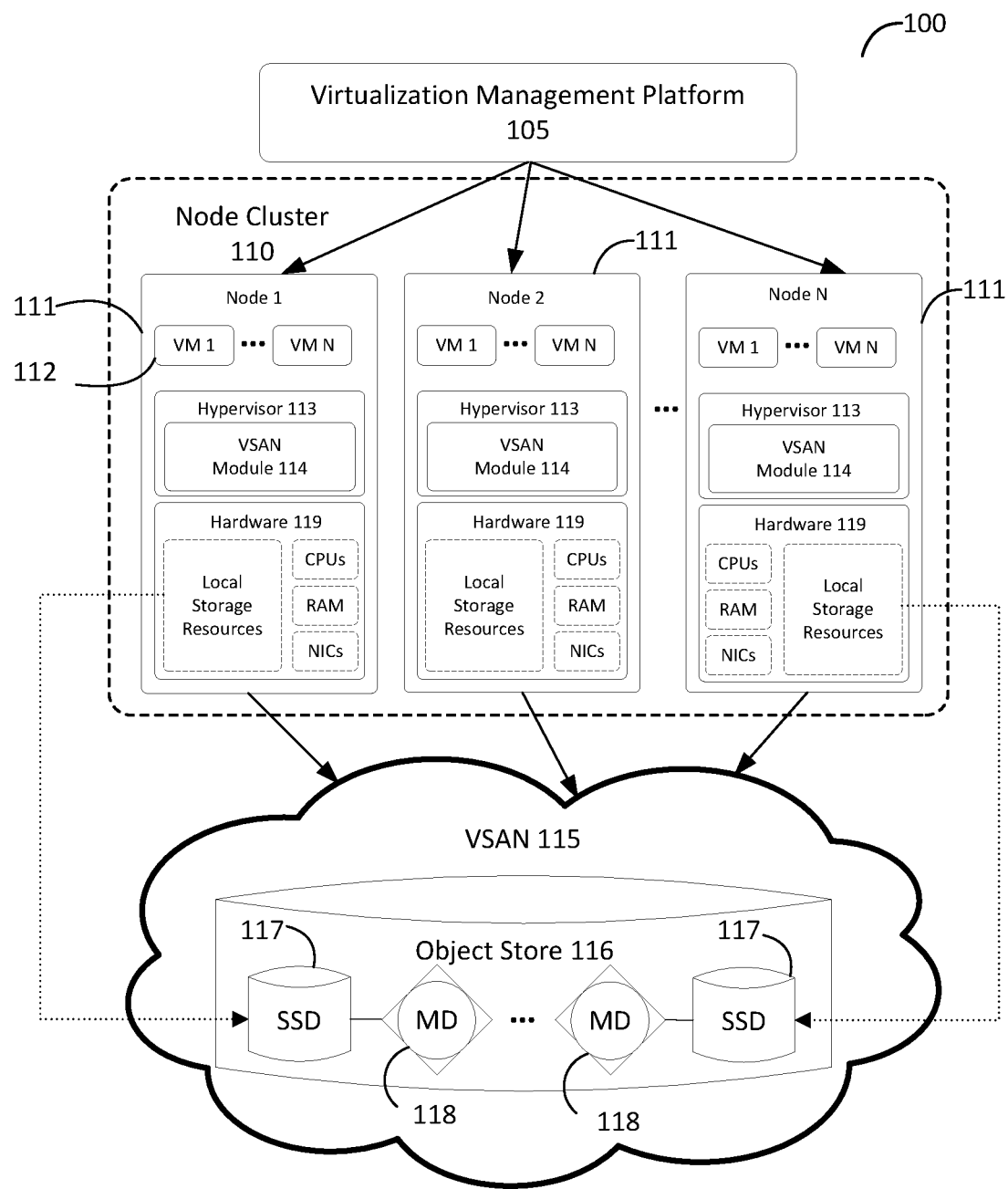
FIG. 1 illustrates an example computing environment in which embodiments may be practiced.

FIG. 1 illustrates a computing environment 100 in which embodiments may be practiced. As shown, computing environment 100 is a software-based "virtual storage area network" (VSAN) environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance. As further discussed below, each node 111 may include a storage management module (referred to herein as a "VSAN module") in order to automate storage management workflows (e.g., create objects in the object store, etc.) and provide access to objects in the object store (e.g., handle I/O operations to objects in the object store, etc.) based on predefined storage policies specified for objects in the object store. For example, because a VM may be initially configured by an administrator to have specific storage requirements for its "virtual disk" depending on its intended use (e.g., capacity, availability, IOPS, etc.), the administrator may define a storage profile or policy for each VM specifying such availability, capacity, IOPS and the like. As further described below, the VSAN module may then create an "object" for the specified virtual disk by backing it with physical storage resources of the object store based on the defined policy.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described below, each hypervisor 113, through its corresponding VSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110.

In one embodiment, VSAN module 114 is implemented as a "VSAN" device driver within hypervisor 113. In such an embodiment, VSAN module 114 provides access to a conceptual "VSAN" 115 through which an administrator can create a number of top-level "device" or namespace objects that are backed by object store 116. For example, during creation of a device object, the administrator specifies a particular file system for the device object (such device objects hereinafter also thus referred to "file system objects") such that, during a boot process, each hypervisor 113 in each node 111 discovers a /vsan/root node for a conceptual global namespace that is exposed by VSAN module 114. By accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may then dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through VSAN 115 may, for example, be implemented to emulate the semantics of a particular file system such as VMware Inc.'s distributed or clustered file system, VMFS, which is designed to provide concurrency control among simultaneously accessing VMs. Because VSAN 115 supports multiple file system objects, it is able to provide storage resources through object store 116 without being confined by limitations of any particular clustered file system. For example, many clustered file systems can only scale to support a certain amount of nodes 111. By providing multiple top-level file system object support, VSAN 115 overcomes the scalability limitations of such clustered file systems.

As described in further detail in the context of FIG. 2 below, a file system object, may, itself, provide access to a number of virtual disk descriptor files accessible by VMs 112 running in cluster 110. These virtual disk descriptor files contain references to virtual disk "objects" that contain the actual data for the virtual disk and are separately backed by object store 116. A virtual disk object may itself be a hierarchical, "composite" object that is further composed of "component" objects (again separately backed by object store 116) that reflect the storage requirements (e.g., capacity, availability, IOPs, etc.) of a corresponding storage profile or policy generated by the administrator when initially creating the virtual disk. Each VSAN module 114 (through a cluster level object management or "CLOM" sub-module, in embodiments as further described below) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a document object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

In some embodiments, one or more nodes 111 of node cluster 110 may be located at a geographical site that is distinct from the geographical site where the rest of nodes 111 are located. For example, some nodes 111 of node cluster 110 may be located at building A while other nodes may be located at building B. In another example, the geographical sites may be more remote such that one geographical site is located in one city or country and the other geographical site is located in another city or country. In such embodiments, any communications (e.g., I/O operations) between the DOM sub-module of a node at one geographical site and the DOM sub-module of a node at the other remote geographical site are performed through a network, such as a wide area network ("WAN").

Figure 2:
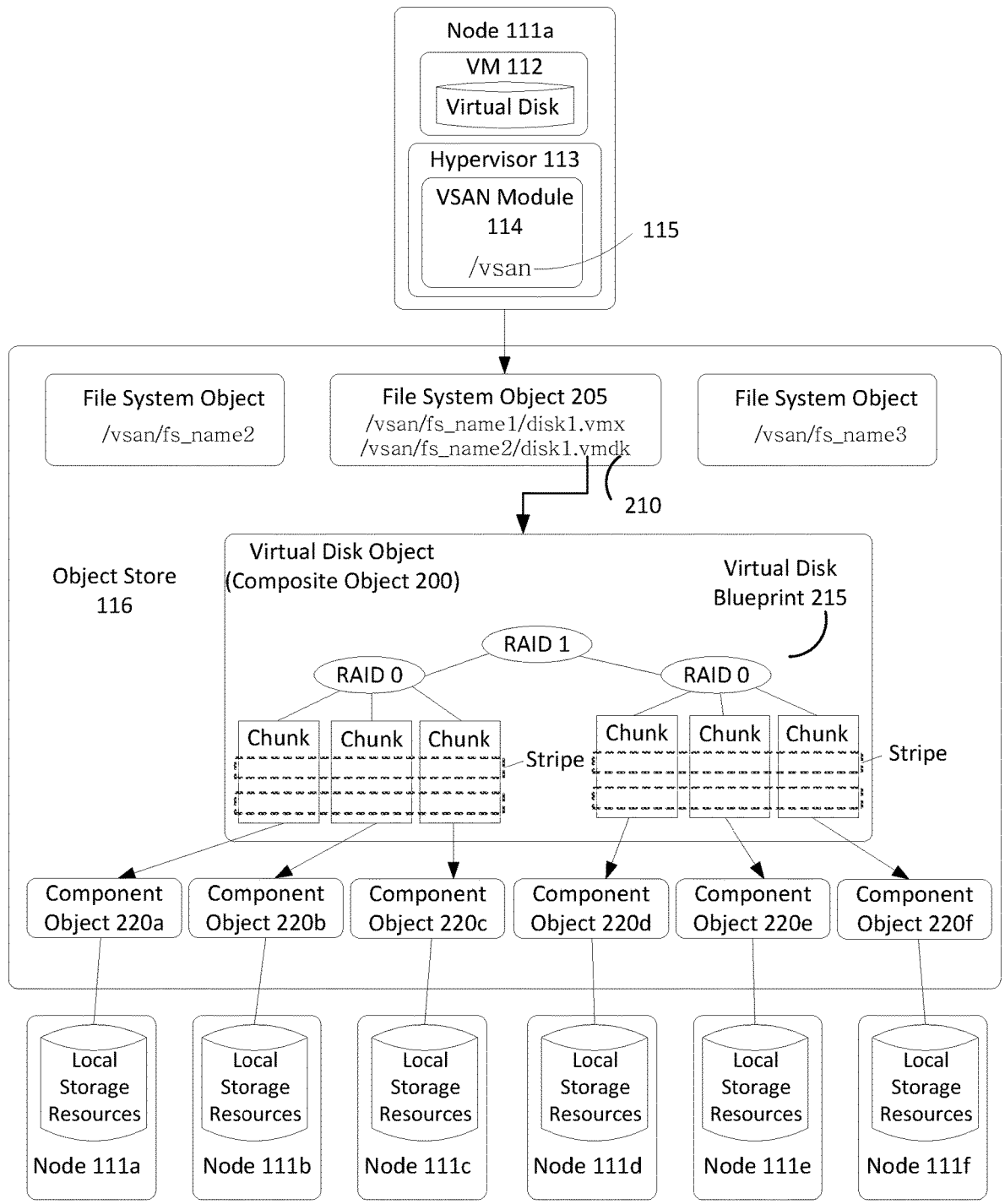
FIG. 2 illustrates an example hierarchical structure of objects organized within an object store that represent a virtual disk.

FIG. 2 illustrates an example hierarchical structure of objects organized within object store 116 that represent a virtual disk. As previously discussed above, a VM 112 running on one of nodes 111 may perform I/O operations on a virtual disk that is stored as a hierarchical composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object). For example, VSAN module 114, by querying its local copy of the in-memory metadata database, is able to identify a particular file system object 205 (e.g., a VMFS file system object in one embodiment, etc.) stored in VSAN 115 that stores a descriptor file 210 for the virtual disk. It should be recognized that the file system object 205 may store a variety of other files consistent with its purpose, such as virtual machine configuration files and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk.

Figure 4:
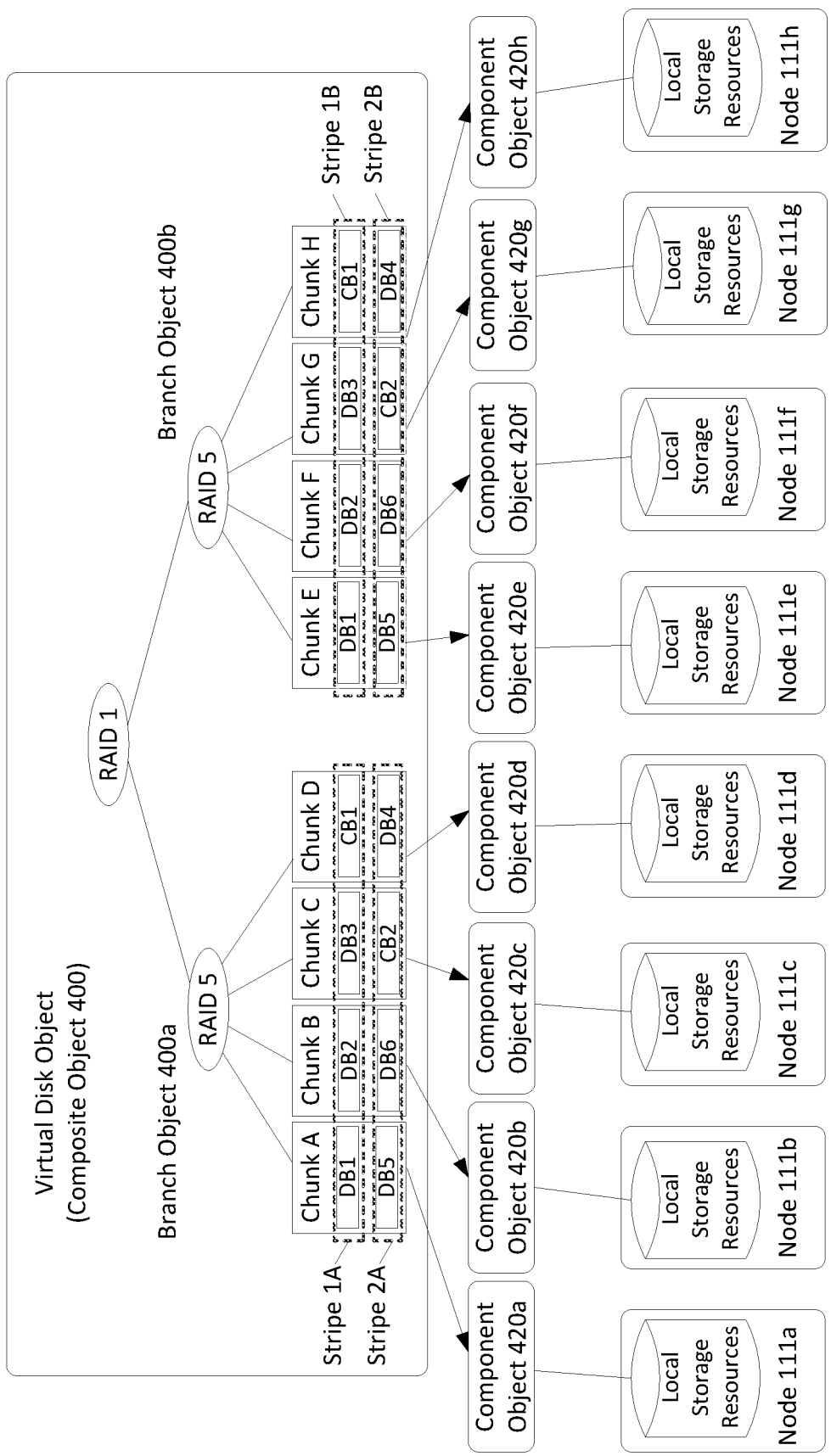
FIG. 4 illustrates an example of applying erasure coding to a virtual disk object.

Depending on the desired level of fault tolerance or performance efficiency, a virtual disk blueprint 215 may direct that data corresponding to composite object 200 be stored in the datastore in a variety of ways. FIG. 2 shows composite object 200 that includes a virtual disk blueprint 215 describing a RAID 1 configuration where two mirrored copies of the virtual disk (e.g., mirrors) are each further striped in a RAID 0 configuration. Data striping refers to segmenting logically sequential data, such as a virtual disk. Each stripe may contain a plurality of data blocks (e.g., DB1, DB2, DB3 in stripe 1 of composite object 200). In some cases, as illustrated in FIG. 4, each stripe may also include one or more code blocks (e.g., RAID 5). As shown, the stripes are then split vertically into different groups of blocks, referred to as chunks, where each chunk is logically represented as a "leaf" or "component" object that composite object 200 contains a reference to. The metadata accessible by VSAN module 114 in the in-memory metadata database for each component object 220 provides a mapping to or otherwise identifies a particular node 111 in cluster 110 that houses the physical storage resources (e.g., magnetic disks 118, etc.) that actually store the chunk (as well as the location of the chunk within such physical resource).

Figure 3:
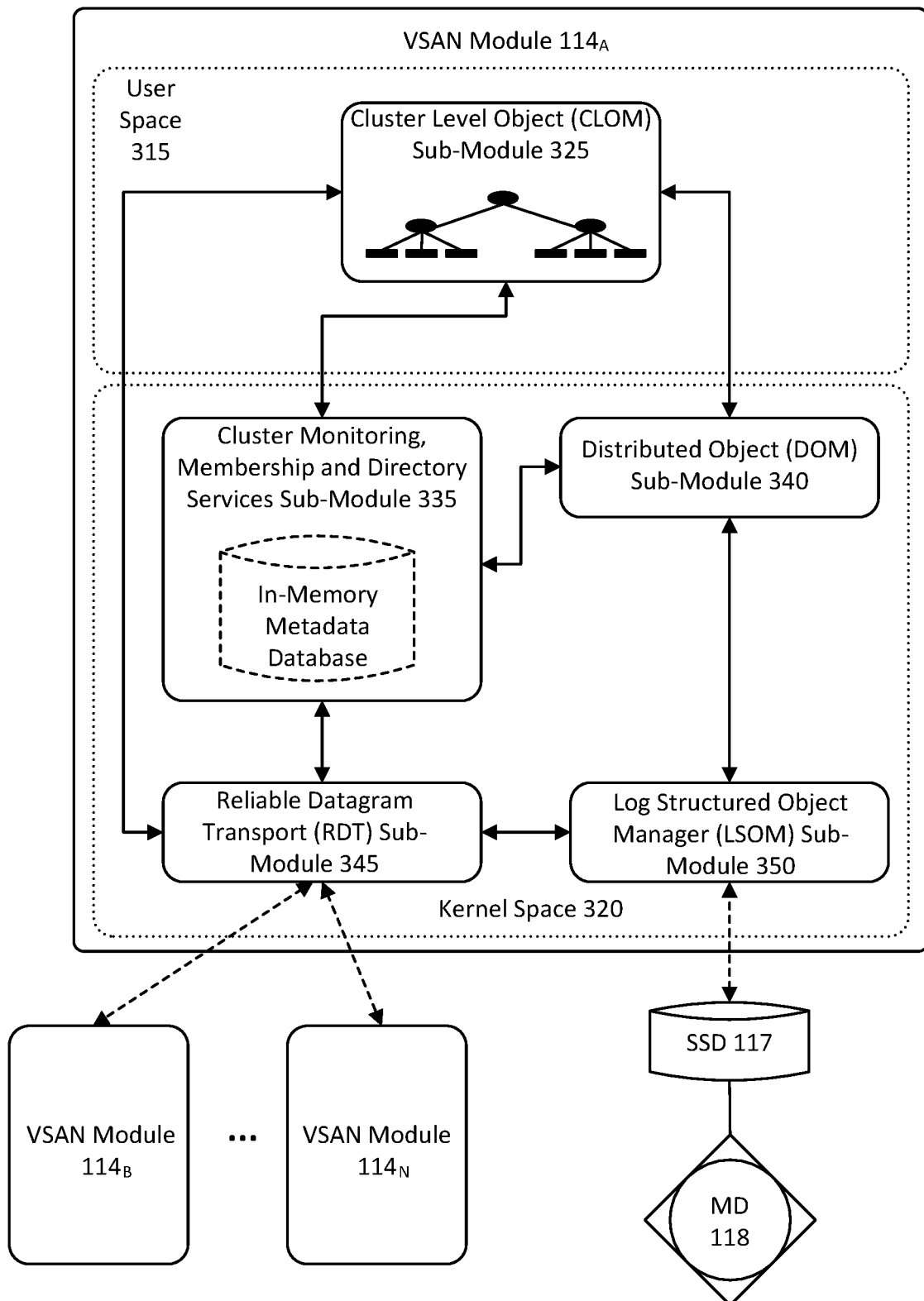
FIG. 3 illustrates components of a VSAN module.

FIG. 3 illustrates components of a VSAN module 114. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In one embodiment, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/chunks of the virtual disk to achieve load balancing, etc.). For example, CLOM sub-module 325, in one embodiment, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., chunks) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and their corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., chunks) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network (e.g., local area network (LAN), or WAN) with a different DOM sub-module 340 in a second node 111 (or nodes) that serves as the coordinator for the particular component object (e.g., chunk, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of the node running the VM would also have to communicate across the network (e.g., LAN or WAN) with the DOM sub-module 340 of the coordinator. In certain embodiments, if the VM issuing the I/O operation resides on node that is different from the coordinator of the virtual disk object subject to the I/O operation, the two DOM sub-modules 340 of the two nodes may communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which nodes 111 should serve as the coordinators for the virtual disk object as well as its corresponding component objects. Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

In some cases, one or more nodes 111 within node cluster 110 may fail or go offline, resulting in a loss of the data and/or code blocks stored by such nodes. In such cases, the distributed storage system or VSAN environment 100 has to be able to tolerate such a failure and efficiently reconstruct the missing data blocks. In some other cases, a node 111 may go offline temporarily and then come back online resulting in some out-of-sync data blocks. To address such cases, the distributed storage system is configured with fault tolerance technologies to resync such out-of-sync data and/or code blocks. Accordingly, to increase performance efficiency and fault tolerance, distributed storage systems (e.g., VSAN environment 100) may implement a variety of fault tolerance technologies, such as the various levels of RAID and/or erasure coding, etc. As described above in relation to FIG. 2, depending on the required level of performance and fault tolerance, virtual disk blueprint 215 may direct that composite object 200 be distributed in one of several ways. In some embodiments, one or a combination of RAID levels (e.g. RAID 0 to RAID 6) is used, where each RAID level or a combination thereof provides a different level of fault tolerance and performance enhancement.

Referring back to FIG. 2, for example, FIG. 2 illustrates an example of the application of RAID 1, which entails creating a replica of composite object 200. This is to ensure that a second copy (e.g., branch object 200b) of composite object 200 is still available if a first copy (e.g., branch object 200a) is lost due to some sort of failure (e.g. disk failure etc.).

In addition to RAID 1, FIG. 2 also illustrates the application of RAID 0 to the two copies of composite object 200 (branch object 200a and branch object 200b, created as a result of RAID 1). Under RAID 0, each copy of composite object 200 is partitioned into smaller data stripes, where each stripe is further segmented into a number of data blocks (e.g., DB1, DB2, DB3, in the first stripe, and DB4, DB5, DB6, in the second stripe) and distributed across local storage resources of various nodes in the datastore. In some cases, striping a copy of composite object 200 over local storage resources of various nodes enhances performance as compared to storing the entire copy of composite object 200 in a single node. This is because striping the data means that smaller amounts of data are written to or read from local storage resources of multiple nodes in parallel, thereby reducing the amount of time to complete a particular read or write operation. However, multiplying the number of nodes used to store the various chunks of data increases the probability of failure, and thus data loss.

To achieve an even higher level of fault tolerance, erasure coding is applied in some embodiments. Erasure coding (EC) is a method of data protection in which each copy of composite object 200 is partitioned into stripes, expanded and encoded with redundant data pieces, and stored across different nodes of the datastore. For example, a copy of composite object 200 is organized or partitioned into stripes, each of which is broken up into N equal-sized data blocks. Erasure codes are then used to encode an additional M equal-sized code block(s) (interchangeably referred to as "parity blocks") from the original N data blocks, where N is a larger number than M.

The M equal-sized code block(s) then provide fault tolerance and enable reconstruction of one or more lost data blocks in the same stripe should one or more of the underlying nodes fail. More specifically, each code block includes parity values computed from the N data blocks in the same stripe using an erasure coding algorithm. An application of an exclusive OR (i.e., XOR) operation to the N data blocks of the stripe, for computing a code block, is one example of applying an erasure coding algorithm, in which case the computed code block contains the XOR of data corresponding to the N data blocks in the stripe. In such an example, if one of the N data blocks is lost due a failure of its underlying node, it is then able to be reconstructed by performing an XOR operation of the remaining data blocks as well as the computed code block in the same stripe. Depending on the level of fault tolerance desired, different erasure codes are applied in creating the one or more M code blocks. RAID 5 and RAID 6 are common examples of applying erasure coding. In RAID 5, an exclusive OR (i.e. XOR) operation is performed on multiple data blocks to compute a single parity block. An example of the application of RAID 5 in a distributed storage system is illustrated in FIG. 4.

FIG. 4 shows each copy of composite object 400 (i.e., branch object 400a and branch object 400b) being erasure coded with a 3+1 ratio, such that each copy is partitioned into multiple stripes (e.g. stripes 1A-NA, stripes 1B-NB), where each stripe is further broken up into 3 data blocks (N) and 1 code block (M) (e.g. 3+1 ratio). As shown, the stripes are then split vertically into different groups of blocks, referred to as chunks, where each chunk is logically represented as a component object (e.g., component object 420a) that composite object 400 contains a reference to. As described above, the metadata for each component object then provides a mapping to or otherwise identifies a particular node 111 that has been selected for storing the chunk of blocks corresponding to the component object. Accordingly, each chunk of composite object 400 is stored in a different node (e.g. node 111a through node 111f) based on the mapping of its corresponding component object to the node.

The (3+1) EC ratio, described above, is merely an example and is not intended to limit the scope of the present disclosure. For example, under RAID 5, a smaller or larger number of data blocks, such as 2, 4, 5 or 6 or 10 data blocks, may be used to generate a single code block, resulting in EC ratios of (2+1), (4+1), (5+1), (6+1), or (10+1), etc., respectively. In addition, in some embodiments, each data or code block includes 1 MB of data such that each data stripe comprises 3 MB of data. In other embodiments, the data or code blocks may have other sizes, ranging from 0.1 MB to 10 GB, or higher.

Figure 5:
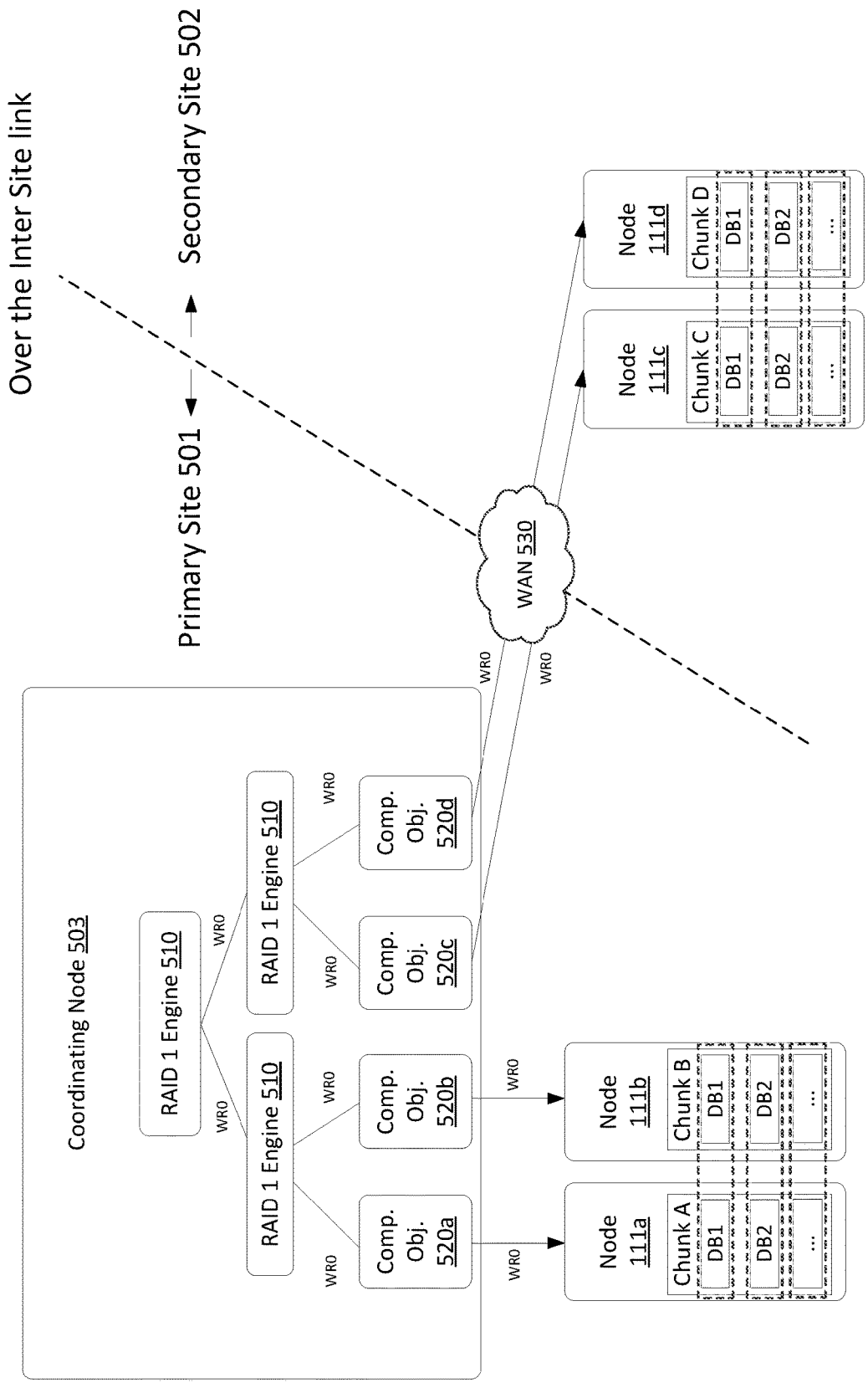
FIG. 5 illustrates an example of a virtual disk object being replicated across two geographically distinct sites.

As described above in relation to FIG. 1, in some embodiments, one or more nodes 111 of node cluster 110 may be located at a geographical site that is distinct from the geographical site where other nodes 111 are located. FIG. 5 illustrates an example where node 111a and node 111b are located at primary site 501 while node 111c and node 111d are located at secondary site 502. In some embodiments, nodes 111a and 111b are connected together via a LAN at primary site 501 and nodes 111c and 111d are connected together via a LAN in secondary site 502. Further, one or more of nodes 111a and 111b may communicate with one or more of nodes 111c and 111d through WAN 530.

FIG. 5 also illustrates a composite object being replicated across two sites by the application of RAID 1. As described above, when creating a virtual disk or virtual disk object for a VM 112 through VSAN module 114 of a node within the cluster, an administrator configures a storage policy or profile reflecting the storage requirement of the virtual disk. Also during the creation of the virtual disk object, as described in relation to FIG. 3, a node is selected and configured to serve as a "coordinator" or "owner" (e.g., coordinating node 503) that controls access to the virtual disk object.

Based on the storage policy created by the administrator, CLOM sub-module 325 of coordinating node 503 (or the node creating the object, if different) then generates a virtual disk blueprint (e.g., virtual disk blueprint 215) that is stored in the in-memory metadata database. Also stored as metadata for the composite object is an indication of the type of RAID engine for the application of the different levels of RAID, such as RAID 1, to any payload generated for the composite object. This indication may be provided by a pointer to code, corresponding to the type of RAID engine, in the memory of coordinating node 503. RAID 1 engine 510 is a logical representation of a type of RAID engine used to distribute data corresponding to component objects 520a-520d of the composite object across various nodes in the cluster based on the virtual disk blueprint.

As an example, an administrator may configure a storage policy to ensure that a virtual disk is replicated four times and stored by four different nodes across two geographically distinct sites (e.g., primary site 501 and secondary site 502). Based on such a storage policy, in some embodiments, CLOM sub-module 325 generates a virtual disk blueprint such that any data generated for the composite object is mirrored into four copies or component objects (i.e., component objects 520a, 520b, 520c, 520d). This entails two consecutive applications of RAID 1 to any payload generated for the composite object. A logical representation of the resulting virtual disk blueprint is illustrated by FIG. 5, where a first application of RAID 1 by RAID 1 engine 510 to the composite object results in two branch objects and a second application of RAID 1 by RAID 1 engine 510 to each branch object results in four component objects 520a, 520b, 520c, 520d.

Having created the virtual disk blueprint, CLOM sub-module 325 then communicates it to DOM sub-module 340 to map each of the four component objects of the composite object to a node (e.g., nodes 111a, 111b, 111c, and 111d) that has been selected to store the data corresponding to the component object. Based on the mapping performed by DOM sub-module 340, an RDT connection is then established by RDT sub-module 345 for each component object 520 between coordinating node 503 and a node (e.g., node 111a-111d) selected to store data corresponding to the component object. All I/O operations are then performed through these RDT connections. For example, any payload generated for the composite object is mirrored into four copies and stored as chunks A-D in their respective nodes 111a-111d through the RDT connections established by RDT sub-module 345 between coordinating node 503 and nodes 111a-111d.

In some cases, storing chunks C and D in nodes 111c and 111d of secondary site 502 may be beneficial because any incident occurring at primary site 501, resulting in both nodes 111a and 111b being inaccessible, may not impact chunks C and D stored at secondary site 502. However, because the two sites are located at a distance from each other, any I/O operations between the nodes located at primary site 501 and the nodes located at secondary site 502 are transmitted over WAN 530. Such transmission of I/O operations between primary site 501 and secondary site 502 over WAN 530 results in amplification of data transmission between the two sites (referred to herein as "data amplification") in cases where a virtual disk is replicated across the two sites, as shown in FIG. 5.

For example, in FIG. 5, when payload is generated for the composite object (i.e., the virtual disk) by a VM 112 at primary site 501, coordinating node 503 receives a write request that includes the payload. Based on the virtual disk blueprint, coordinating node 503 then determines that the write request has to be replicated four times. As a result, coordinating node 503 performs a first application of RAID 1 using RAID 1 engine 510 that results in two write request (WR0). Coordinating node 503 then performs a second application of RAID 1 on each of the two write requests, resulting in a total of four write requests (WR0) for transmission to each one of chunks A, B, C, and D in order to keep all copies synchronized.

Accordingly, two separate write requests (WR0), each including the same payload, are sent over WAN 530 to chunks C and D at secondary site 502. Transmitting the same payload to secondary site 502 twice, however, is not only suboptimal but also results in additional network traffic, the transmission of which leads to additional costs being incurred for the client. Accordingly, the embodiments described herein relate to configuring a leader node at primary site 501 and a proxy node at secondary site 502 to reduce data amplification.

Figure 6:
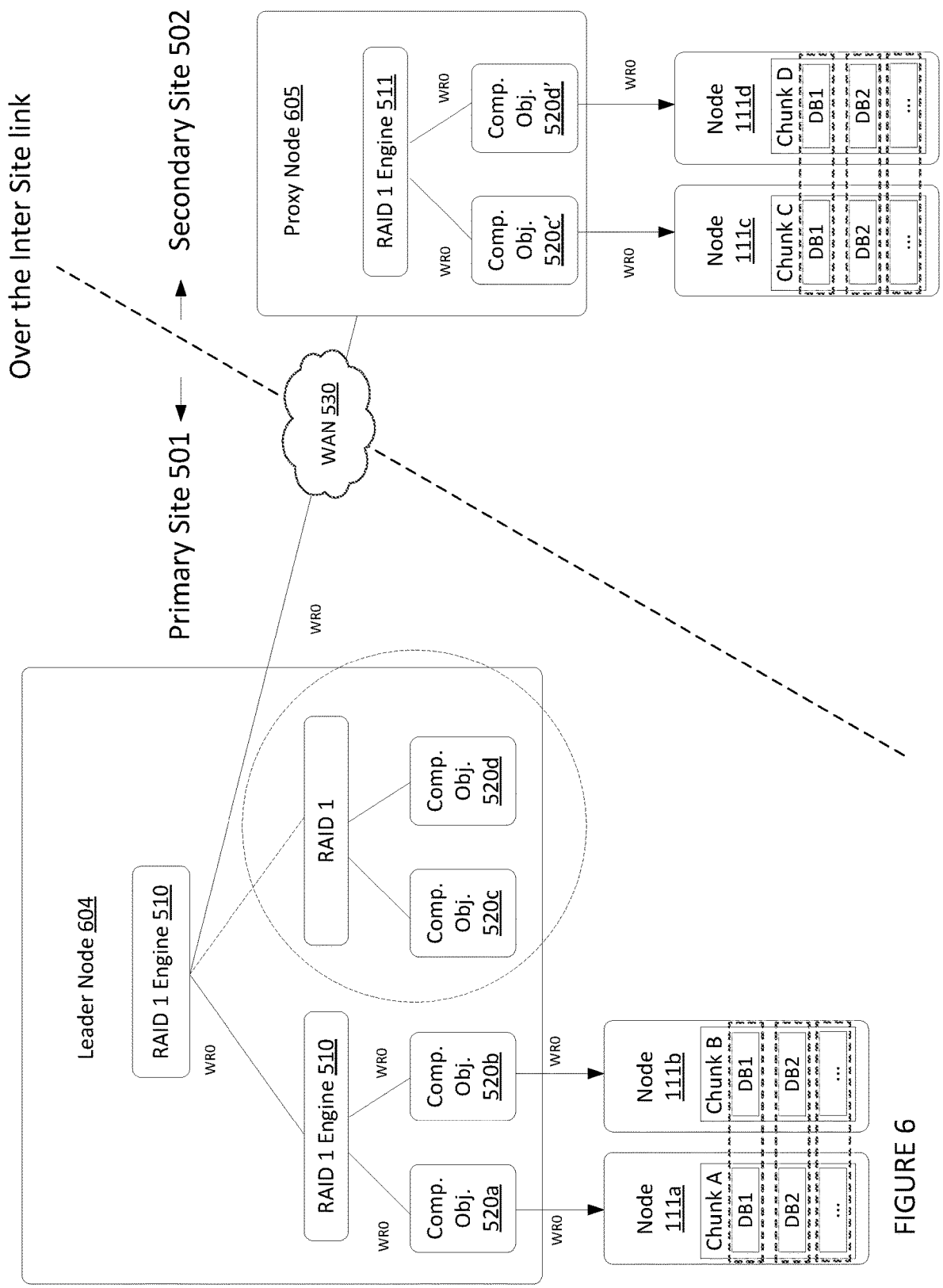
FIG. 6 illustrates an example of a leader node and a proxy node configured for reducing data amplification across two geographically distinct sites of FIG. 5.

FIG. 6 illustrates an example of an embodiment for reducing data amplification across two sites (i.e., primary site 501 and secondary site 502) by configuring a leader node 604 at primary site 501 and a proxy node 605 at secondary site 502. FIG. 6 shows the same environment as FIG. 5 with the exception of leader node 604 and proxy node 605. Similar to FIG. 5, in the embodiment of FIG. 6, the storage policy configured by the administrator requires that the virtual disk be replicated four times and stored by four different nodes across two geographically distinct sites (e.g., primary site 501 and secondary site 502). As a result, a composite object, including component objects 520a-520d, is created based on a virtual disk blueprint generated by CLOM sub-module 325. A full memory representation of the composite object is stored in the in-memory metadata database of leader node 604. As described above in relation to FIG. 5, DOM sub-module 340 then maps component objects 520a-520d to nodes 111a-111d, respectively.

In contrast to FIG. 5, however, in the embodiment of FIG. 6, once VSAN module 114 of the coordinating node determines that the storage policy requires the replication of the virtual disk at a remote node, instead of selecting a single coordinating node (e.g., coordinating node 503 of FIG. 5), VSAN module 114 proceeds with selecting and configuring leader node 604 at primary site 501 and also selecting and configuring proxy node 605 at secondary site 502.

Leader node 604 performs the same responsibilities as coordinating node 503 of FIG. 5, with the exception that no RDT connections are established, for component objects 520c and 520d, between leader node 604 and nodes 111c and 111d, respectively. Instead, as described below, proxy node 605 is selected and configured as a proxy coordinating node whose RDT sub-module 345 establishes RDT connections for component objects 520c' and 520d' (copies of component objects 520c and 520d, respectively, whose memory representations are stored at proxy node 605) between proxy node 605 and one or more nodes 111c-111d at secondary site 502. Component objects 520c and 520d whose memory representations are stored at leader node 604 and have no RDT connections to nodes 111c and 111d are shown in a dotted circle. Although no RDT connections are established for component objects 520c and 520d between nodes 111c-111d and leader node 604, component objects 520c and 520d still subscribe to CMMDS entries made with CMMDS sub-module 335 of leader node 604 relating to nodes 111c and 111d. This allows CMMDS sub-module 335 of leader node 604 to provide VSAN module 114 of leader node 604 as well as other nodes in the cluster with information about the state of nodes 111c and 111d. As an example, if node 111c goes offline, VSAN module 114 of leader node 604 is notified based on changes in CMMDS entries relating to node 111c that component object 520c subscribed to.

To configure a node to act as proxy node, VSAN module 114 of leader node 604 first selects one of the nodes from among the nodes at secondary site 502 (e.g., nodes 111c and 111d) that have been mapped to component objects 520c and 520d. Subsequently, VSAN module 114 of leader node 604 transmits an operation to the selected node to configure it as a proxy coordinating node.

In some embodiments, the payload of the operation includes a copy of a part of the virtual disk blueprint of the composite object (copy of the memory representation for component objects 520c and 520d) for directing how data received by proxy node 605, from leader node 604, is to be distributed among the nodes of secondary site 502. For example, in the embodiment of FIG. 6, the payload includes a copy of the part of the virtual disk blueprint that indicates how payload generated for one or more of component objects 520c and 520d is to be distributed among nodes located at secondary site 502. Proxy node 605 stores the part of the virtual disk blueprint, shown as component objects 520c' and 520d', in the in-memory metadata database and uses it to establish one or more RDT connections with one or more nodes at secondary site 502. In the embodiment of FIG. 6, for example, if node 111c is selected as proxy node 605, RDT sub-module 345 of node 111c then establishes an RDT connection with node 111d for transmitting data relating to component object 520d' to node 111d.

The payload of the operation also includes an indication about the type of RAID engine for use by VSAN module 114 of proxy node 605 to distribute data based on the part of the virtual disk blueprint. In some embodiments, the indication is a pointer to code stored in the memory of proxy node 605. RAID 1 engine 511 provides a logical representation of the type of RAID engine that proxy node 605 would utilize to distribute data received for component objects 520c' and 520d'.

Accordingly, after a node selected from secondary site 502 receives the operation from leader node 604, it is configured to act as a proxy coordinating node by locally applying appropriate RAID logic and distributing data resulting from the RAID operation based on the part of the virtual disk blueprint received from the leader node. Therefore, in the embodiment of FIG. 6, for example, any payload generated for component objects 520c and 520d, is transmitted by leader node 604 directly over to proxy node 605 for distribution using RAID 1 engine 511.

Figure 7:
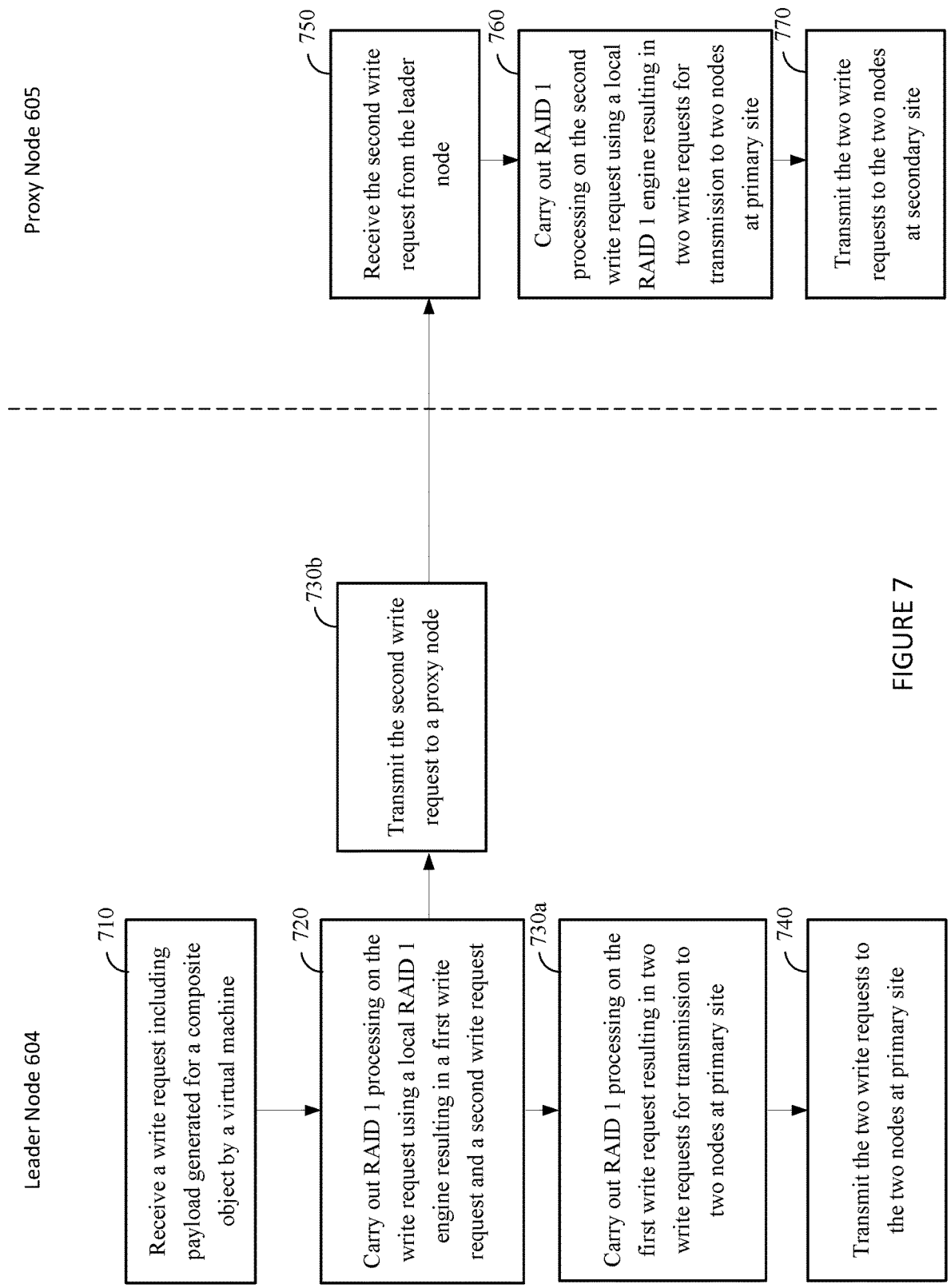
FIG. 7 illustrates example operations for use by the leader node and proxy node of FIG. 6 when payload is generated for the virtual disk object.

FIG. 7 illustrates example operations for distributing payload for component objects 520a-520d of FIG. 6, in accordance with some embodiments. The payload may be generated for the composite object of FIG. 6 due to an update to a corresponding virtual disk of a VM 112.

At 710, leader node 604 receives a write request including payload generated for the composite object by a VM 112 executing on leader node 604 or a different node in node cluster 110. DOM sub-module 340 of leader node 604 then refers to the virtual disk blueprint of the composite object, having component objects 520a-520d, and determines that any payload generated for the composite object is required to be replicated into four copies by two consecutive applications of RAID 1. Based on the virtual disk blueprint, DOM sub-module 340 also determines that component objects 520a, 520b, 520c, and 520d are mapped to nodes 111a, 111b, 111c, and 111d, respectively. By referring to metadata stored in the in-memory metadata database for the composite object, DOM sub-module 340 further determines that there are no RDT connections established for component objects 520c and 520d between leader node 604 and nodes 111c and 111d, respectively, and that proxy node 605 has been selected for coordinating operations relating to component objects 520c and 520d.

At 720, DOM sub-module 340 of leader node 604 then carries out RAID 1 processing on the write request by utilizing local RAID 1 engine 510 resulting in a first write request and a second write request (WR0), where each of the write requests includes the payload as well as a command for carrying out a second RAID 1 processing.

At 730a, DOM sub-module 340 of leader node 604 uses local RAID engine 510 for carrying out a second level of RAID 1 processing to replicate the first write request resulting in two write requests for transmission to nodes 111*a* and node 111*b*.

At 730*b*, DOM sub-module 340 of leader node 604 transmits the second write request generated at step 720 to proxy node 605, over WAN 530, for proxy node 605 to carry out the second level of RAID 1 processing locally. As shown in FIG. 7, step 730*b* is performed at the same time that step 730*a* is performed. Accordingly, in the embodiment of FIG. 7, after the first application of RAID 1 at step 720, leader node 604 performs steps 730*a* and 730*b* in parallel. In some other embodiments, one step may be performed prior to the other.

At 740, DOM sub-module 340 of leader node 604 then transmits the two write requests generated at step 730*a* to nodes 111*a* and node 111*b* over RDT connections established for component objects 520*a* and 520*b* between leader node 604 and nodes 111*a*-111*b*, respectively. In embodiments where leader node 604 is one of nodes 111*a* or 111*b*, DOM sub-module 340 of leader node 604 satisfies one of the write requests by storing the payload in its own local storage resources while transmitting the other write request to the other one of the nodes at primary site 501.

At 750, proxy node 605 receives the second write request transmitted by leader node 604 at step 730*b*. In some embodiments, because steps 730*a* and 730*b* are performed in parallel, steps 750 to 770 are also performed in parallel to step 740. In other words, step 740 may be completed before or after one or all of steps 750-770.

At 760, DOM sub-module 340 of proxy node 605 then carries out RAID 1 processing based on the second write request by referring to the part of the virtual disk blueprint stored in its in-memory metadata database as well as RAID engine 511, which results in two write requests corresponding to component objects 520*c*'-520*d*'.

At 770, DOM sub-module 340 then transmits the two write requests to nodes 111*c* and 111*d* through RDT connections established for component objects 520*c*' and 520*d*' between proxy node 605 and nodes 111*c*-111*d*, respectively. In embodiments where proxy node 605 is one of nodes 111*c* or 111*d*, DOM sub-module 340 of proxy node 605 satisfies one of the write requests by storing the payload in its own local storage resources while transmitting the other write request to the other one of the nodes at secondary site 502.

As a result, in contrast to FIG. 5 where DOM sub-module 340 of the coordinating node sent two write requests to node 111*c* and node 111*d*, configuring a leader node at primary site 501 and a proxy node secondary site 502 reduces the number of write requests and the amount of payload that needs to be sent over WAN 530.

Figure 8:
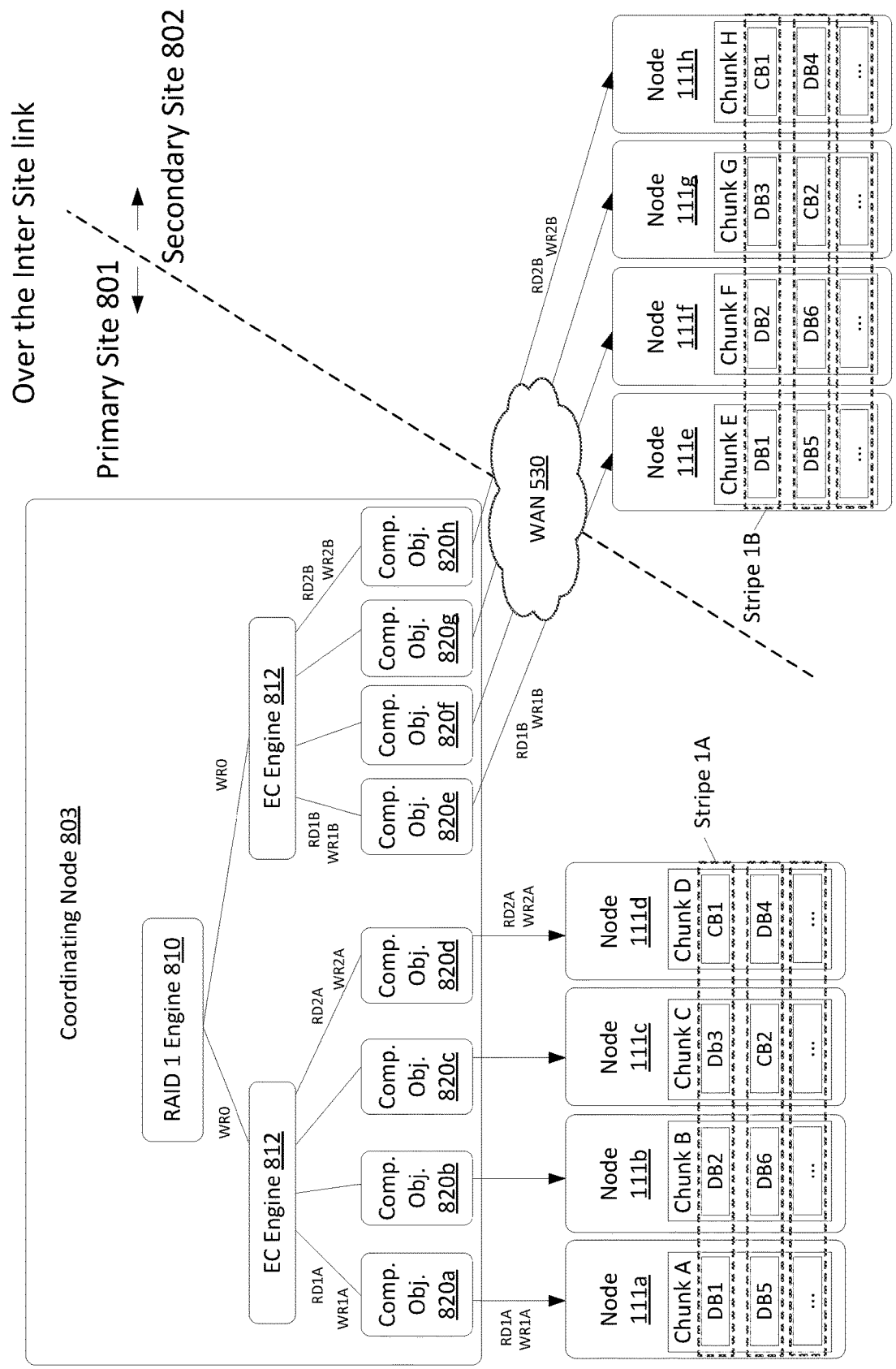
FIG. 8 illustrates an example of a virtual disk object being replicated and erasure coded across two geographically distinct sites.

FIG. 8 illustrates another example of a multi-site cluster of nodes similar to the cluster shown in FIG. 5, except that instead of two consecutive applications of RAID 1, FIG. 8 illustrates the application of RAID 1 in combination with the application of RAID 5, resulting in component objects 820*a*-820*h*. As described in relation to FIG. 5, without selecting and configuring a node at secondary site 802 to act as a proxy coordinating node, RDT connections are established between coordinating node 803 and all of nodes 111*a*-111*h*, spread across primary site 801 and secondary site 802, for component objects 820*a*-820*h*. As a result, any I/O operation issued by coordinating node 803 for one of component objects 820*e*-820*h* is transmitted by coordinating node 803 to the corresponding node (i.e., nodes 111*e*-111*h*) over WAN 530, which results in data amplification.

As an example, let's assume a write request has been generated by a VM for DB 1 of chunk A due to an update. In such an example, DOM sum-module 340 of coordinating node 803 performs a first application of RAID 1 using RAID 1 engine 810, resulting in two write requests (WR0) each including payload corresponding to the update as well as a command requesting a subsequent application of RAID 5 to the payload. Next, DOM sub-module 340 of coordinating node 803 uses erasure coding (EC) engine 812 to perform the subsequent RAID 5 operations for updating DB1 of chunks A and E as well as CB1 of chunks D and H.

More specifically, based on the first write request (WR0), DOM sub-module 340 of coordinating node 803 issues read operation RD1A to node 111*a* to read the existing data stored in DB1 of chunk A. At the same time, based on the second write request (WR0), DOM sub-module 340 of coordinating node 803 issues and transmits read operation RD1B to node 111*e* over WAN 530 in order to read the existing data stored in DB1 of chunk E. The existing data stored in DB1 of each one of chunks A and E is then XOR'ed with the payload, providing a "delta" for each of DB1 of chunk A and DB1 of chunk E. Each delta corresponds to the portion of the payload that is not already included in DB1 of each one of chunks A and D.

DOM sub-module 340 of coordinating node 803 then issues read operation RD2A to node 111*d* that contains CB1 of chunk D, which is the corresponding code block for DB1, DB2, and DB3 of stripe 1A while also issuing and transmitting read operation RD2B to node 111*h* containing CB1 of chunk H, which is the corresponding code block for DB1, DB2, and DB3 of stripe 1B. DOM sub-module 340 of coordinating node 803 then reads the contents of each of the two CB1 blocks of chunks D and H and performs an XOR of the contents of each of the CB1 blocks and the corresponding delta of DB1 of chunk A and DB1 of chunk E, respectively. This results in generating a new CB1 for each of the corresponding data blocks being updated. DOM sub-module 340 of coordinating node 803 then issues write operation WR1A to node 111*a* to write the delta to DB1 of chunk A while also generating write operation WR2A to node 111*d* to write the newly computed CB1 of chunk D. At the same time, DOM sub-module 340 of coordinating node 803 issues write operation WR1B to node 111*e* to write the delta to DB1 of chunk E while also generating write operation WR2B to node 111*h* to write the newly computed CB1 of chunk H.

Accordingly, as described by the example above, without selecting and enabling a node at secondary site 802 to act as a proxy node, an update to a data block of the composite object of FIG. 8 results in 2 read operations (i.e., RD1B and RD2B) and two write operations (i.e., WR1B and WR2B) over WAN 530.

Figure 9:
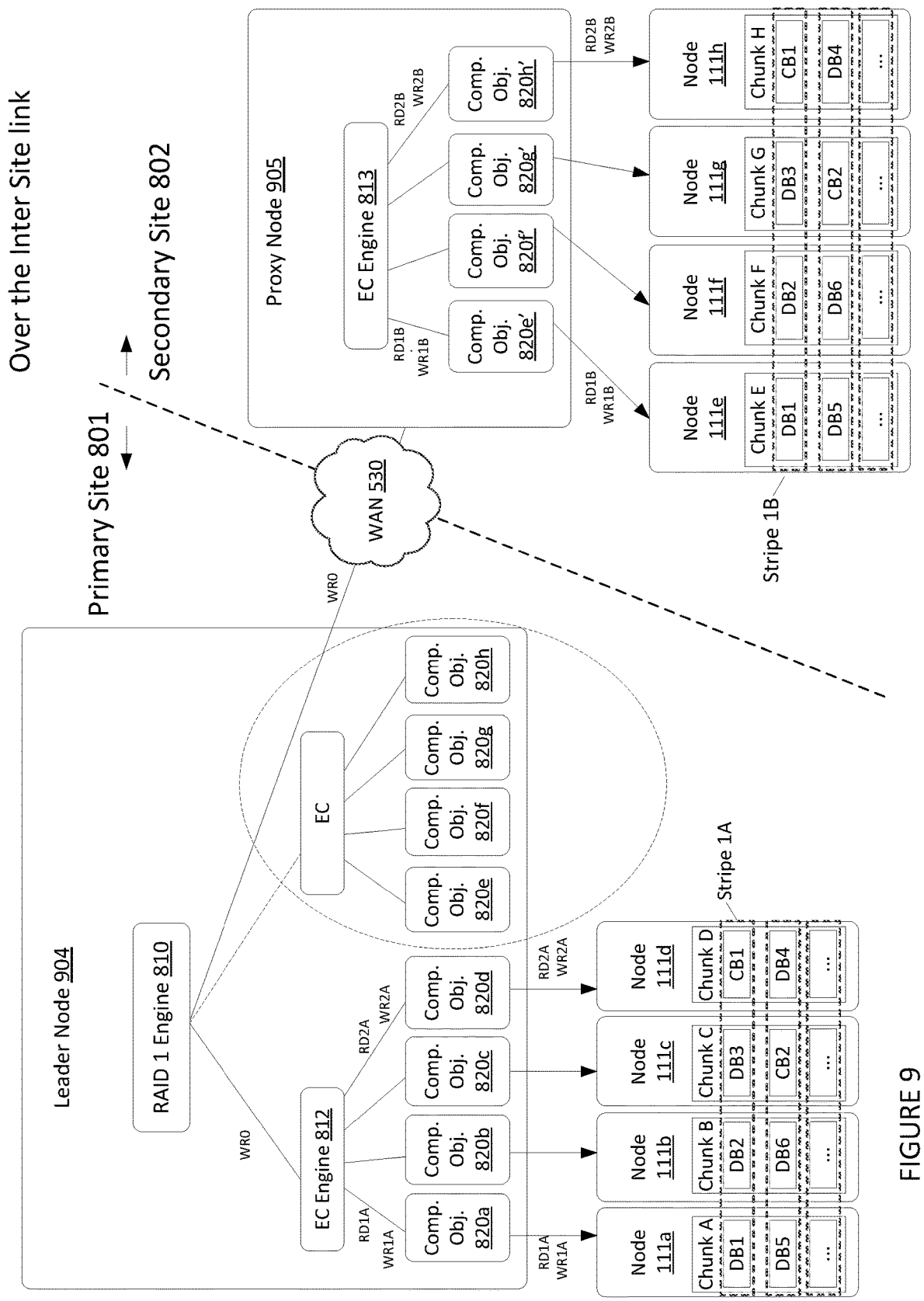
FIG. 9 illustrates an example of a leader node and a proxy node configured for reducing data amplification across two geographically distinct sites of FIG. 8.

FIG. 9 illustrates an example of an embodiment for reducing data amplification across two sites (i.e., primary site 801 and secondary site 802) by selecting and configuring a leader node 904 at primary site 801 and a proxy node 905 at secondary site 802. FIG. 9 shows the same environment as FIG. 8 with the exception of leader node 904 and proxy node 905. Leader node 904 and proxy node 905 are configured in a manner similar to the configuration of leader node 605 and proxy node 905, respectively. Accordingly, leader node 904 establishes no RDT connections with nodes 111*e*-111*h* for component objects 820*e*-820*h*. Instead RDT connections are established for component objects 820*e*'-820*h*' between proxy node 905 and nodes 111*e*-111*h*, respectively.

Further, as described in relation to FIG. 6, to configure a proxy node, leader node 904 first selects a node from among nodes 111*e*-111*h* and transmits an operation to the selected node. The payload of the operation includes a copy of a part of the virtual disk blueprint of the composite object (copy of the memory representation for component objects 820e-820h) that indicates how payload generated for one or more of component objects 820e-820h is to be distributed among nodes 111e-111h located at secondary site 802. Proxy node 905 stores the part of the virtual disk blueprint, shown as component objects 820e'-820h', in the in-memory metadata database and uses it to establish one or more RDT connections with one or more nodes at secondary site 802. Also, as described above, the virtual disk blueprint of the composite object of FIG. 9 involves the application of RAID 5 (i.e., a common example of erasure coding) to each of the branch objects. Accordingly, unlike FIG. 6 where the payload included an indication about the type of RAID engine, the payload for configuring proxy node 905 includes an indication about the type of EC engine for use by proxy node 905 to perform RAID 5 processing. In some embodiments, the indication may be a pointer to code stored in the memory of proxy node 905. EC engine 812 provides a logical representation of the type of EC engine for enabling VSAN module 114 of proxy node 905 to perform erasure coding and distribute any payload received from leader node 904 based on the part of the virtual disk blueprint. Accordingly, having configured proxy node 905, any payload generated for component objects 820e-820h, is transmitted by leader node 904 directly over to proxy node 905 for erasure coding and distribution.

Figure 10:
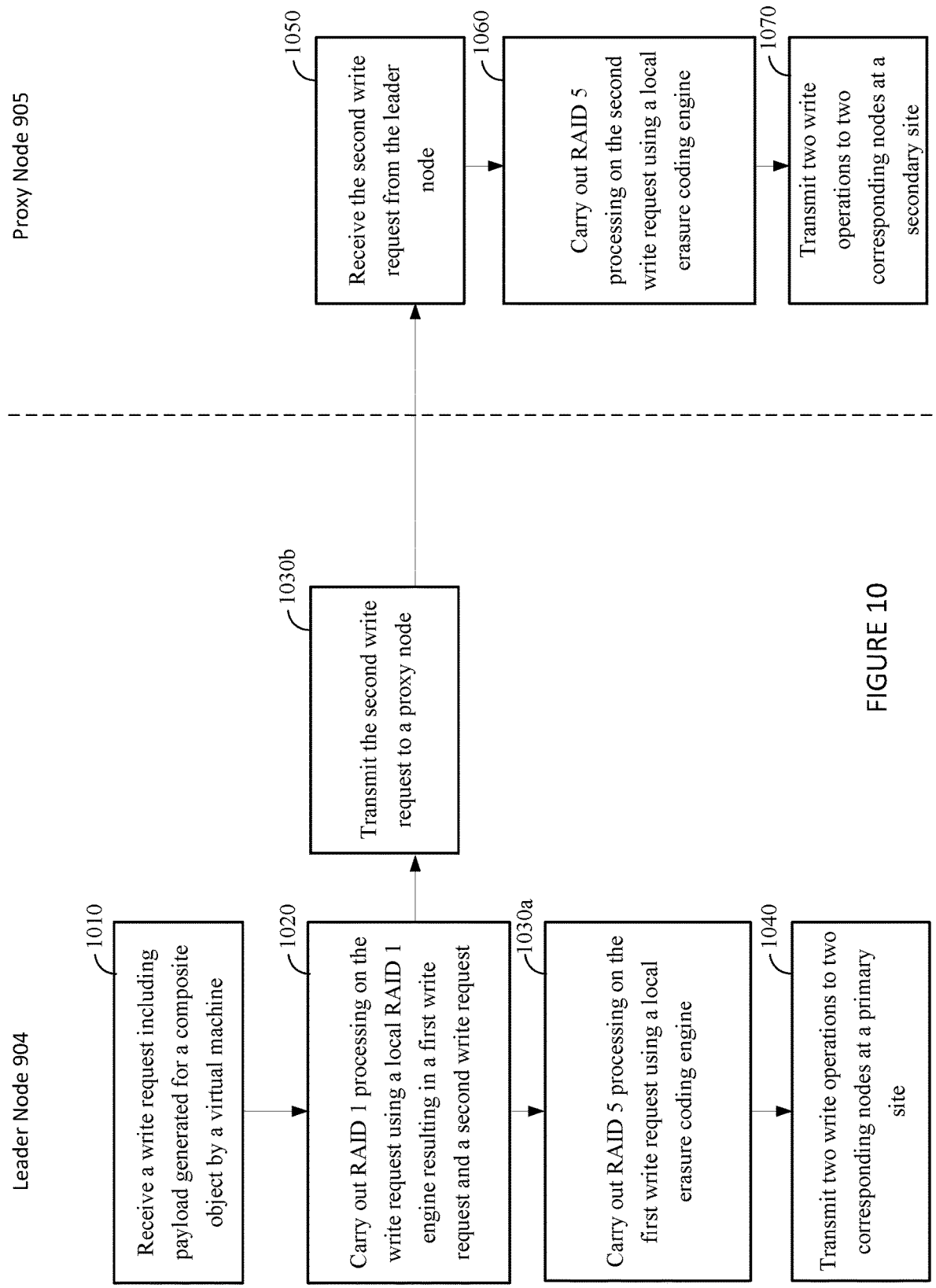
FIG. 10 illustrates example operations for use by the leader node and proxy node of FIG. 9 when payload is generated for the virtual disk object.

FIG. 10 illustrates example operations for distributing payload for component objects 820a-820h of FIG. 9, in accordance with some embodiments. The payload may be generated for the composite object of FIG. 9 due to an update to a corresponding virtual disk of a VM 112.

At 1010, leader node 904 receives a write request including payload generated for the composite object by a VM 112 executing on leader node 904 or a different node in node cluster 110. DOM sub-module 340 of leader node 904 then refers to the virtual disk blueprint of the composite object, having component objects 820a-520h, and determines that any payload generated for the composite object is required to be replicated into two copies across primary site 801 and 802 and further erasure coded and distributed by the application of RAID 5. Based on the virtual disk blueprint, DOM sub-module 340 also determines that component objects 820a-820h are mapped to nodes 111a-111h, respectively. By referring to metadata stored in the in-memory metadata database for the composite object, DOM sub-module 340 further determines that there are no RDT connections established between leader node 904 and nodes 111e-111h for component objects 820e and 820h, respectively, and that proxy node 905 has been configured for coordinating operations relating to component objects 820e and 820h.

At 1020, DOM sub-module 340 of leader node 904 then carries out RAID 1 processing on the write request by utilizing local RAID 1 engine 810 resulting in a first write request (WR0) and a second write request (WR0), where each of the write requests includes the payload as well as a command for carrying out RAID 5 processing.

At 1030a, based on the first write request, DOM sub-module 340 of leader node 604 uses local EC engine 812 to issue read operation RD1A to node 111a to read the existing data stored in DB1 of chunk A. The existing data stored in DB1 of chunks A is then XOR'ed with the payload, providing a "delta" that corresponds to the portion of the payload that is not already included in DB1 of chunk A. DOM sub-module 340 of leader node 904 then issues read operation RD2A to node 111d that contains CB1 of chunk D, which is the corresponding code block for DB1, DB2, and DB3 of stipe 1A. Next, DOM sub-module 340 of leader node 904 reads the contents of the CB1 block of chunk D and performs an XOR of the contents of the CB1 block and the delta, derived above, for chunk D. This results in generating a new CB1 in response to DB1 of stripe 1A being updated.

At 1030b, DOM sub-module 340 of leader node 904 transmits the second write request generated at step 1020 to proxy node 905, over WAN 530, for proxy node 905 to carry out the RAID 5 processing using its local EC engine 812. As shown in FIG. 10, step 1030b is performed at the same time that step 1030a is performed. Accordingly, after the application of RAID 1 at step 1020, leader node 604 performs steps 1030a and 1030b in parallel. In some other embodiments, one step may be performed prior to the other.

At 1040, DOM sub-module 340 of leader node 604 then issues write operation WR1A to node 111a to write the delta to DB1 of chunk A while also transmitting write operation WR2A to node 111d to write the newly computed CB1 of chunk D. These write operations are, in some embodiments, transmitted over RDT connections established between leader node 904 and nodes 111a-111d. In embodiments where leader node 904 is one of nodes 111a or 111d, DOM sub-module 340 of leader node 904 satisfies one of the write requests by storing the corresponding payload (i.e., the delta for DB1 or the newly computed CB1) in its own local storage resources while transmitting the other write request to the other one of the nodes at primary site 801 using an RDT connection.

At 1050, proxy node 905 receives the second write request transmitted by leader node 904 at step 1030b. In some embodiments, because steps 1030a and 1030b are performed in parallel, steps 1050 to 1070 are also performed in parallel to step 1040. In other words, step 1040 may be completed before or after one or all of steps 1050-1070.

At 1060, DOM sub-module 340 of proxy node 905 then uses local EC engine 813 to issue read operation RD1B to node 111e to read the existing data stored in DB1 of chunk E through an RDT connection established for component object 820e' between proxy node 905 and node 111e. The existing data stored in DB1 of chunks E is then XOR'ed by local EC engine 813 with the payload, providing a delta that corresponds to the portion of the payload that is not already included in DB1 of chunk E. DOM sub-module 340 of proxy node 905 then issues read operation RD2B to node 111h (through an RDT connection established for component object 820h' between proxy node 905 and node 111h) that contains CB1 of chunk H, which is the corresponding code block for DB1, DB2, and DB3 of stripe 1B. Next, DOM sub-module 340 of proxy node 905 reads the contents of the CB1 block of chunk H and performs an XOR of the contents of the CB1 block and the corresponding delta of DB1 of chunk E. This results in generating a new CB1 in response to DB1 of stripe 1B being updated.

At 1070, DOM sub-module 340 then then issues write operation WR1B to node 111e to write the delta to DB1 of chunk E while also transmitting write operation WR2B to node 111h to write the newly computed CB1 of chunk H.

As a result, in contrast to FIG. 8 where DOM sub-module 340 of coordinating node 803 sent 2 read operations (i.e., RD1B and RD2B) and two write operations (i.e., WR1B and WR2B) over WAN 530, configuring a leader node at primary site 801 and a proxy node at secondary site 802 reduces the number of write and read requests and the amount of payload that needs to be sent over WAN 530.

Embodiments described above may be extended to distributed storage systems where an object is replicated at more than two sites. In addition, embodiments described above similarly apply in cases where an application of an erasure coding algorithm results in more than one code block, such as ones employing a 6+2 coding scheme or a 9+3 coding scheme.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method of replicating component objects of a virtual disk, that are backed by first storage nodes, which are at a primary site, in second storage nodes, which are at a secondary site, said method comprising:

at a coordinating node at the primary site, responsive to receiving a write command issued to the virtual disk, (i) issuing a first write operation and a replica of the first write operation, (ii) transmitting a second write operation, identical to the first write operation, to a coordinating node at the secondary site responsible for replicating data received from the coordinating node at the primary site on the second storage nodes, and (iii) instructing, responsive to the first write operation and the replica of the first write operation, the first storage nodes that are backing first and second component objects of the virtual disk to write data on at least two corresponding local storage devices, wherein the coordinating node at the secondary site, responsive to receiving the second write operation, (i) issues a replica of the second write operation and (ii) instructs the second storage nodes that are backing third and fourth component objects to write data on at least two corresponding local storage devices.

2. The method of claim 1, wherein the data written on the at least two corresponding local storage devices of the first storage nodes are identical to the data written on the at least two corresponding local storage devices of the second storage nodes.

3. The method of claim 2, wherein the data written on each of the at least two corresponding local storage devices of the first storage nodes are identical, and the data written on each of the at least two corresponding local storage devices of the second storage nodes are identical.

4. The method of claim 2, wherein the data written on the at least two corresponding local storage devices of the first storage nodes include first data, which is written in at least one local storage device of one of the first storage nodes, and second data, which is written in at least one local storage device of another one of the first storage nodes, and the data written on the at least two corresponding local storage devices of the second storage nodes include the first data and the second data, the first data being written in at least one local storage device of one of the second storage nodes and the second data being written in at least one local storage device of another one of the second storage nodes.

5. The method of claim 4, wherein the first data is user data and the second data is parity data.

6. The method of claim 1, wherein the instructing by the coordinating nodes at the primary and the secondary sites are performed by their respective RAID 1 engines.

7. The method of claim 1, wherein the instructing by the coordinating nodes at the primary and the secondary sites are performed by their respective RAID 5 engines.

8. The method of claim 1, wherein the coordinating node at the primary site further includes a replication module that issues the first and second write operations.

9. A non-transitory computer readable medium comprising instructions to be executed in a coordinating node at a primary site to carry out a method of replicating component objects of a virtual disk, that are backed by first storage nodes, which are at the primary site, in second storage nodes, which are at a secondary site, said method comprising:

responsive to receiving a write command issued to the virtual disk, (i) issuing a first write operation and a replica of the first write operation, (ii) transmitting a second write operation, identical to the first write operation, to a coordinating node at the secondary site responsible for replicating data received from the coordinating node at the primary site on the second storage nodes, and (iii) instructing, responsive to the first write operation and the replica of the first write operation, the first storage nodes that are backing first and second component objects of the virtual disk to write data on at least two corresponding local storage devices, wherein the coordinating node at the secondary site, responsive to receiving the second write operation, (i) issues a replica of the second write operation and (ii) instructs the second storage nodes that are backing third and fourth component objects to write data on at least two corresponding local storage devices.

10. The non-transitory computer readable medium of claim 9, wherein the data written on the at least two corresponding local storage devices of the first storage nodes are identical to the data written on the at least two corresponding local storage devices of the second storage nodes.

11. The non-transitory computer readable medium of claim 10, wherein the data written on each of the at least two corresponding local storage devices of the first storage nodes are identical, and the data written on each of the at least two corresponding local storage devices of the second storage nodes are identical.

12. The non-transitory computer readable medium of claim 10, wherein the data written on the at least two corresponding local storage devices of the first storage nodes include first data, which is written in at least one local storage device of one of the first storage nodes, and second data, which is written in at least one local storage device of another one of the first storage nodes, and the data written on the at least two corresponding local storage devices of the second storage nodes include the first data and the second data, the first data being written in at least one local storage device of one of the second storage nodes and the second data being written in at least one local storage device of another one of the second storage nodes.

13. The non-transitory computer readable medium of claim 12, wherein the first data is user data and the second data is parity data.

14. The non-transitory computer readable medium of claim 9, wherein the instructing by the coordinating nodes at the primary and the secondary sites are performed by their respective RAID 1 engines.

15. The non-transitory computer readable medium of claim 9, wherein the instructing by the coordinating nodes at the primary and the secondary sites are performed by their respective RAID 5 engines.

16. The non-transitory computer readable medium of claim 9, wherein the coordinating node at the primary site further includes a replication module that issues the first and second write operations.

17. A distributed computer system for replicating first and second component objects of a virtual disk, comprising:

a first coordinating node;

first storage nodes that back the first and second component objects, the first storage nodes communicating with the first coordinating node through a first local area network;

a second coordinating node communicating with the first coordinating node through a wide area network; and second storage nodes that back third and fourth component objects, which are replicas of the first and second component objects, respectively, the second storage nodes communicating with the second coordinating node through a second local area network, wherein responsive to receiving a write command issued to the virtual disk, the first coordinating node (i) issues a first write operation and a replica of the first write operation, (ii) transmits a second write operation, identical to the first write operation, to the second coordinating node responsible for replicating data received from the first coordinating node on the second storage nodes, and (iii) instructs, responsive to the first write operation and the replica of the first write operation, the first storage nodes that are backing the first and second component objects to write data on at least two corresponding local storage devices, wherein the second coordinating node, responsive to receiving the second write operation, (i) issues a replica of the second write operation and (ii) instructs the second storage nodes that are backing the third and fourth component objects to write data on at least two corresponding local storage devices of the second storage nodes.

18. The distributed computer system of claim 17, wherein the instructing by the coordinating nodes at the primary and the secondary sites are performed by their respective RAID 1 engines.

19. The distributed computer system of claim 17, wherein the instructing by the coordinating nodes at the primary and the secondary sites are performed by their respective RAID 5 engines.

20. The distributed computer system of claim 17, wherein the first coordinating node further includes a RAID 1 engine that issues the first and second write operations.

* * * * *